D. SLAUGHTER.
Seed-Drill Tooth.
No. 107,554.  Patented Sept. 20, 1870.
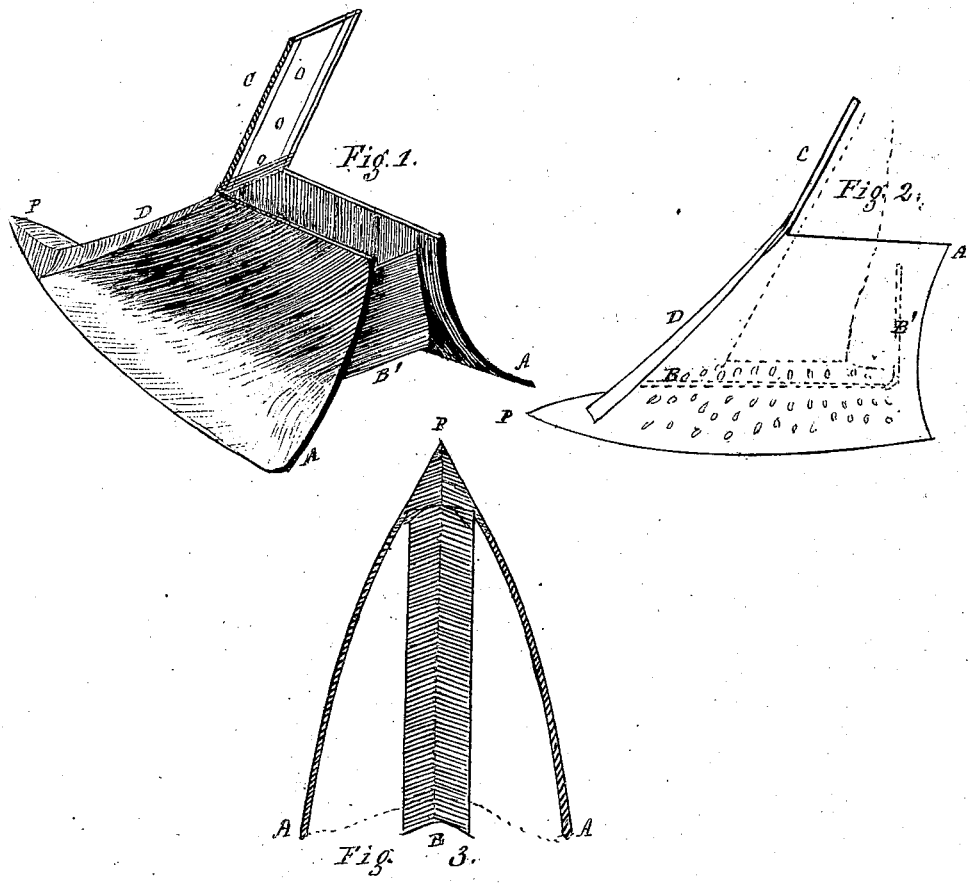

United States Patent Office.

DAVID SLAUGHTER, OF MOUNTVILLE, PENNSYLVANIA.

Letters Patent No. 107,554, dated September 20, 1870; antedated September 12, 1870.

IMPROVEMENT IN SHOVELS FOR SEEDERS.

The Schedule referred to in these Letters Patent and making part of the same.

I, DAVID SLAUGHTER, of Mountville, in the county of Lancaster and State of Pennsylvania, have invented certain Improvements on Shovels for Seed-Planters, of which the following is a specification.

The nature of my invention consists in introducing a central seed-scattering device longitudinally, so as to receive the seed from the spout or hopper and scatter it near the bottom of the furrow, between the flared sides of the shovel, so as to produce the effect of broad cast sowing instead of distributing the seed in the narrow furrows, or in distinct lines or rows, as is the case when sown in the ordinary ways.

The accompanying drawing will illustrate the improvement.

Figure 1 is a perspective view of the shovel, as seen from the rear.

Figure 2 shows the same in outline or profile.

The dotted lines B horizontally show the position of the scattering plate or ridge B', bent up behind nearly or quite at a right angle, so as to prevent the seed from falling out behind, boxing it in with the sides A, which are flared below and drawn in above, as shown by fig. 1.

C is a projecting flange, by which the shovel is attached.

Figure 3 shows the ground plan of the shovel, with the scattering ledge B.

The flared sides A A and point P, with the keeled front D, in themselves, do not constitute any special novelty.

The scattering device is believed to be novel, when introduced near the bottom of the scoring-shovel, so that it will perform the office of scattering the seed that falls on it, in such a manner as to be covered up by the pulverized mold or soil, as the seed rolls from the dividing-ridge or plate B, on both sides of the same, as well as rolling under it, and so as to distribute the seed from one furrow to the other in drilling in or seeding.

Seed sown with the ordinary furrowing-shovel, it is well known, comes up in distinct, dense rows, leaving blank spaces between them which bear no grain.

To remedy this defect is the object of my invention. I do, therefore, not confine myself to any precise elevation or construction of this dividing or scattering-device, as experience may slightly modify the same; a trial, however, made by giving the plate B a central elevated ridge, with straight or slightly curved inclined sides, has proved highly satisfactory.

Attempts have been made to scatter the seed above more or less remote from the base of the furrow, but proved a waste of the seed, by falling where the soil would not cover it. This is prevented by inserting the scattering plate, so as to be lower than the soil impinging against the outer sides, and falling inward from both sides to cover the seed after being distributed and lodged or scattered across the entire furrow made by the shovel.

I also propose using a rake, connected with the rear of the harrow or drill, to give the soil a uniform level dress, in the wake of the shovels.

The ordinary seed-planters can be used, and the shovels attached by any of the means in use, with the ordinary spouts, or by making them wider one way and narrower the other, so as to spread out along the scattering ridge-plate B.

What I claim as my invention, and desire to secure by Letters Patent, is—

The arrangement and combination of the prolonged cutter D C and spreading sides A A with the internal ridge-piece B B', turned up behind, so as to form the shovel, in the manner shown, for the purpose specified.

DAVID SLAUGHTER.

Witnesses:
JOHN M. GIRDER,
WILLIAM ROBERTS.